Patented Oct. 30, 1945

2,388,189

UNITED STATES PATENT OFFICE 2,388,189

AMINO ACID SYNTHESIS

Carl E. Schweitzer, Newport, Del., assignor to E. I. du Pont de Nemours & Company, Wilmington, Del., a corporation of Delaware No Drawing. Application October 2, 1943, Serial No. 504,795

6 Claims. (Cl. 260—534)

This invention relates to the synthesis of amino acids, and particularly to the synthesis of amino acids from amino nitriles.

Amino acids have been prepared in the past by several methods. A study of the various methods of preparing amino-acetic acid is reported in "Organic Syntheses," Collective Volume I, pages 298–301, Gillman and Blatt, 1941, published by John Wiley and Sons, Inc. For example, methyleneaminoacetonitrile and aminoacetonitrile have been saponified with solutions of alkali earth hydroxides to form solutions of alkali earth metal salts of aminoacetic acid. Free aminoacetic acid in solution has been liberated from these salts by precipitating the alkali earth metal as carbonate or sulfate.

The salts of amino acids exhibit unique behavior when treated with a week acid, such as carbonic acid. Thus, when calcium aminoacetate is treated with carbon dioxide in aqueous solution under ordinary conditions a slow and partial precipitation of calcium carbonate occurs. For reasons of economy it would be desirable to liberate amino acids from their alkali earth metal salts by treatment with carbon dioxide, because the carbonates thus produced could be converted in a separate step to oxide or hydroxide, and could be used repeatedly in the saponification of the amino nitrile. This has not been possible hitherto, because of the slow and incomplete reaction of carbon dioxide with the salt of the amino acid.

In accordance with the present invention, however, aminonitriles are saponified, and the saponification products are converted rapidly and quantitatively to the free aqueous amino acid by treatment with carbon dioxide. This is accomplished as a result of the discovery that the amino acid salts and carbon dioxide at elevated temperatures and pressures do not exhibit the slow and partial action which is observed when carbon dioxide is absorbed in the amino acid salt at ordinary temperature and pressure, but instead a rapid conversion to the amino acid takes place.

In accordance with this invention an amino nitrile is saponified, and the saponification product is treated with carbon dioxide under superatmospheric pressure at elevated temperature. In one specific embodiment, aminoacetonitrile is saponified with a suspension of alkali earth hydroxide, and solution of alkali earth salt of aminoacetic acid thus obtained is agitated with carbon dioxide under superatmospheric pressure and elevated temperature, causing a precipitation of alkali earth carbonate. The alkali earth carbonate is removed, suitably by filtration, and the remaining liquor is concentrated to obtain the aminoacetic acid.

The amino nitriles which may be used in this invention include the primary, secondary and tertiary amino nitriles which form water-soluble salts of alkali earth metals, and which also form amino acids which are water-soluble. Since these solubilities are quite low when the total number of carbon atoms in the molecule exceeds 8, the invention is particularly applicable to amino nitriles having from 2 to 8 carbon atoms per molecule. Examples of such nitriles are: aminoacetonitrile, alpha aminopropionitrile, beta aminopropionitrile, gamma aminovaleronitrile, alpha aminocaprylonitrile, alpha aminodiethylacetonitrile, N-methylaminoacetonitrile, N - methoxymethylaminoacetonitrile, N-isobutoxyethylaminoacetonitrile, N - isobutoxymethoxyethylaminoacetonitrile, N-ethylaminoacetonitrile, N,N-diethyl-alpha-aminopropionitrile and N-hexylaminoacetonitrile. The saponification may be carried out with any of the known saponifying agents such as sodium hydroxide, potassium hydroxide, barium hydroxide, calcium hydroxide, strontium hydroxide, or lithium hydroxide. It is preferred to use barium, calcium or strontium hydroxides because when the amino acid salts of these metals are treated with carbon dioxide under pressure and at elevated temperature insoluble carbonates are produced. If a metal hydroxide which yields a soluble carbonate is employed, the amino acid may be separated from such carbonate by fractional crystallization. Of the various saponifying agents which may be employed, the most convenient one to use is barium hydroxide, for, after the saponification and carbon dioxide treatment the recovered barium carbonate can be converted very readily by heat to the oxide, from which it is possible to prepare a suitable aqueous barium hydroxide saponifying solution.

In the practice of this invention the saponification of amino nitrile may be conducted at atmospheric pressure or below, but a more rapid rate of saponification is attained when the reaction is carried out in a closed vessel at a pressure higher than atmospheric and at temperatures above 100° C. Temperatures of 0° to 200° C. may be employed, but the preferred range is 100° to 150° C. Preferably the pressure under which the saponification reaction proceeds may be from 1 to 15 atmospheres. In treating the saponification product with carbon dioxide, temperatures of from 0° to 200° C. may be employed, but the preferred range is 50 to 100° C. Carbon dioxide pressure during treatment of the saponification product with carbon dioxide may be from 1 to 100 atmospheres, the preferred range being from 30 to 50 atmospheres.

The relative quantities of saponifying agent and amino nitrile employed may vary over a very wide range, but it is convenient to use equivalent amounts of saponifying agent and amino nitrile. A few percent excess of saponifying agent is frequently employed. The amount of water present is generally sufficient to dissolve or suspend the saponifying agent, and preferably amounts to from 2 to 20 times the weight of aminonitrile employed. The amount of carbon dioxide which is allowed to dissolve in or react with the saponification product is generally at least sufficient to convert the metal initially present in the saponifying agent to carbonate, although partial or even total conversion to bicarbonate by excess carbon dioxide may also be obtained.

The following examples will serve to illustrate in greater detail the method of practicing this invention.

*Example 1.*—Into a boiling solution of 33.3 grams $Ba(OH)_2.8H_2O$ in 150 cc. water was added 14.1 grams N-methylamino acetonitrile, and the mixture was heated under reflux with stirring for 1 hour, then without stirring for 4 additional hours. The resulting mixture was transferred to an autoclave wherein it was agitated for 15 minutes at 75° C. with carbon dioxide under 40 atmospheres pressure. The slurry obtained in this manner was withdrawn from the autoclave, and the barium carbonate precipitate was removed by centrifuging and filtration. The clear liquor thus obtained was dehydrated by evaporation of water at 45° C., under a pressure of 80 mm. of Hg. A semi-solid residue which weighed 18.2 grams was thus obtained. This was recrystallized from hot water, yielding 6.0 grams N-methylaminoacetic acid, which had a melting point of 204° to 207° C., with decomposition.

*Example 2.*—Into a boiling solution of 33.3 grams $Ba(OH)_2.8H_2O$ in 200 cc. water was added, drop by drop, 56 grams aminoacetonitrile. This required 1.5 hours. The mixture was boiled for an additional hour at atmospheric pressure to complete the hydrolysis and to expel ammonia. The resulting solution of barium aminoacetate was transferred to an autoclave, in which it was processed for 15 minutes with carbon dioxide under 40 atmospheres pressure at 75° C. The slurry thus obtained was centrifuged, and the resulting clear supernatant liquor was drawn off. The precipitate was washed with warm water three times and each time the precipitate was separated from the liquor by centrifuging and drawing off the supernatant liquor. The combined clear liquors thus obtained were concentrated to a volume of 100 c. c. by distilling off the excess water. Upon cooling this concentrate to 20°, 29 grams crystals were obtained. The mother liquor was then concentrated to 25 cc., and an additional 33.5 grams crystals were obtained. The mother liquor from this crystallization was further concentrated to 10 c. c. whereupon an additional 6 grams crystals were obtained. Thus the total yield of aminoacetic acid was 68.5 grams, or 91.5% of the theoretical.

*Example 3.*—A slurry composed of 56 grams aminoacetonitrile, 41 grams calcium hydroxide, and 200 grams water was allowed to stand for 90 hours at 25–30° with occasional stirring. It was then heated to 80–90° for 5 hours, and was finally boiled for 1 hour to remove ammonia. The mixture was then transferred to an autoclave and heated for 15 minutes at 75° with carbon dioxide at 40 atmospheres pressure. The resulting product was centrifuged, and the aminoacetic acid liquor was removed from the precipitate. The precipitate was washed with warm water, and the washings were added to the aminoacetic acid liquor. This mixture was then concentrated, and several batches of crystals were separated until the volume of mother liquor was only 10 c. c. The total weight of crystalline aminoacetic acid thus obtained was 51.6 grams.

The reaction between carbon dioxide and the salt of amino acid, as described above, may be conducted in any heated, suitable pressure resisting vessel such as a steel, stainless steel, aluminum-lined, silver-lined or glass-lined autoclave, preferably equipped with a stirrer or shaking machine.

The carbonation reaction may be conducted either batchwise or continuously. In the continuous process, which is preferably performed under pressure, carbon dioxide may be introduced either at one point or at several points in the reaction vessel.

It will be appreciated that several methods for removing salts of carbonic acid from the carbonation product containing amino acid may be employed without deviating from the principle of this invention. These methods of separating salts of carbonic acid from such solution include filtration, continuous centrifuging, settling, and the like. While in the preferred procedure it is not necessary to resort to fractional crystallization, this method, as above noted, is useful when the saponifying agent is sodium hydroxide or other hydroxide which yields a soluble carbonate. In such instances the saponification product is concentrated by evaporation of solvent until crystals appear. These crystals are removed and the concentration is resumed. These operations are repeated until the volume of mother liquor is very small, and several batches of crystals have been obtained. The intermediate batches are dissolved in a minimum amount of solvent and fractionated again in the same manner. Fractions of like composition are combined for the refractionations. Ultimately the amino acid and soluble carbonate are obtained in appreciable yield as the intermediate batches of crystals become smaller and smaller in quantity due to the refractionation. When the saponifying agent is barium hydroxide, or other hydroxide which yields an insoluble carbonate, a clear solution of amino acid is obtained after removal of this insoluble carbonate. Several methods may be employed for recovering amino acids from this solution. Such methods include evaporation of solvent, chilling to cause crystallization, and addition of a non-solvent such as alcohol.

Having now described my invention I claim:

1. In a process for preparing amino acetic acid, the steps which comprise heating aminoacetonitrile in water with calcium hydroxide at 0° to 200° C. and thereafter introducing carbon dioxide into the resulting solution of calcium aminoacetate at 50° to 100° C., under 30 to 50 atmospheres pressure, separating precipitated calcium carbonate from the solution of aminoacetic acid thus obtained and evaporating water from the supernatant liquor, thus forming crystals of aminoacetic acid.

2. In a process for the preparation of amino acids of the formula $RNHCH_2COOH$, in which R is a member of the class consisting of hydrogen and methyl groups, the step which comprises treating an aqueous solution of an alkali earth metal salt of the said amino acid with carbon dioxide under superatmospheric pressure, whereby the alkali earth metal is precipitated as carbonate and free amino acid in solution is liberated.

3. In a process for the preparation of aminoacetic acid, the step which comprises treating an aqueous solution of an alkali earth metal salt of the said amino acid with carbon dioxide at a temperature within the range of about 0° to 200° C. under a superatmospheric pressure within the range of about 1 to 100 atmospheres, whereby the alkali earth metal is substantially completely precipitated as carbonate and free amino acid is liberated in solution.

4. The process set forth in claim 3 in which the alkali earth metal hydroxide is barium hydroxide.

5. The process set forth in claim 3 in which the alkali earth metal hydroxide is calcium hydroxide.

6. In a process for the preparation of amino acids, the step which comprises treating an aqueous solution of barium salt of N-methyl aminoacetic acid with carbon dioxide at a temperature of about 50° to 100° C. under a pressure of about 30 to 50 atmospheres, whereby the barium is precipitated as carbonate, and N-methyl aminoacetic acid is liberated in solution.

CARL E. SCHWEITZER.